Aug. 17, 1943.  A. BERGMANN  2,326,920
APPARATUS FOR THE MANUFACTURE OF ARTIFICIAL SAUSAGE SKINS
Original Filed April 5, 1939  3 Sheets-Sheet 3

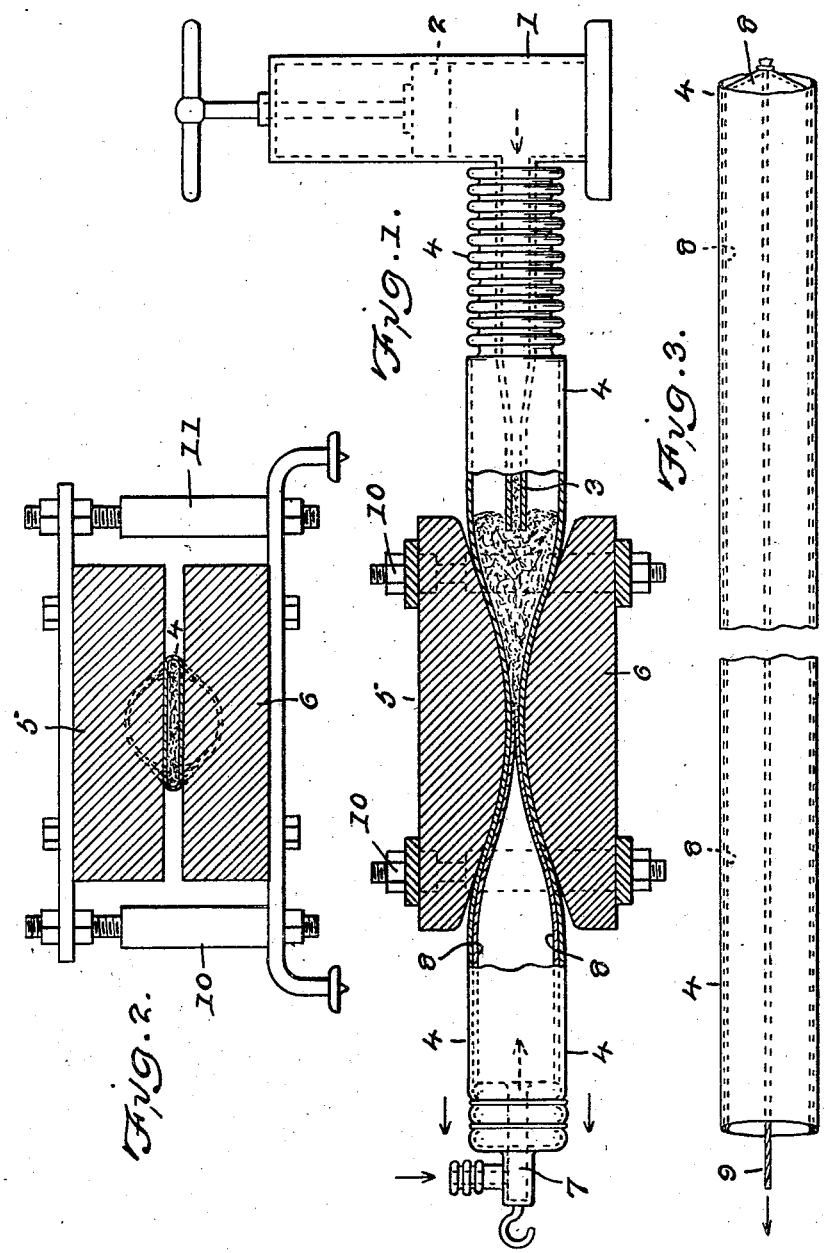

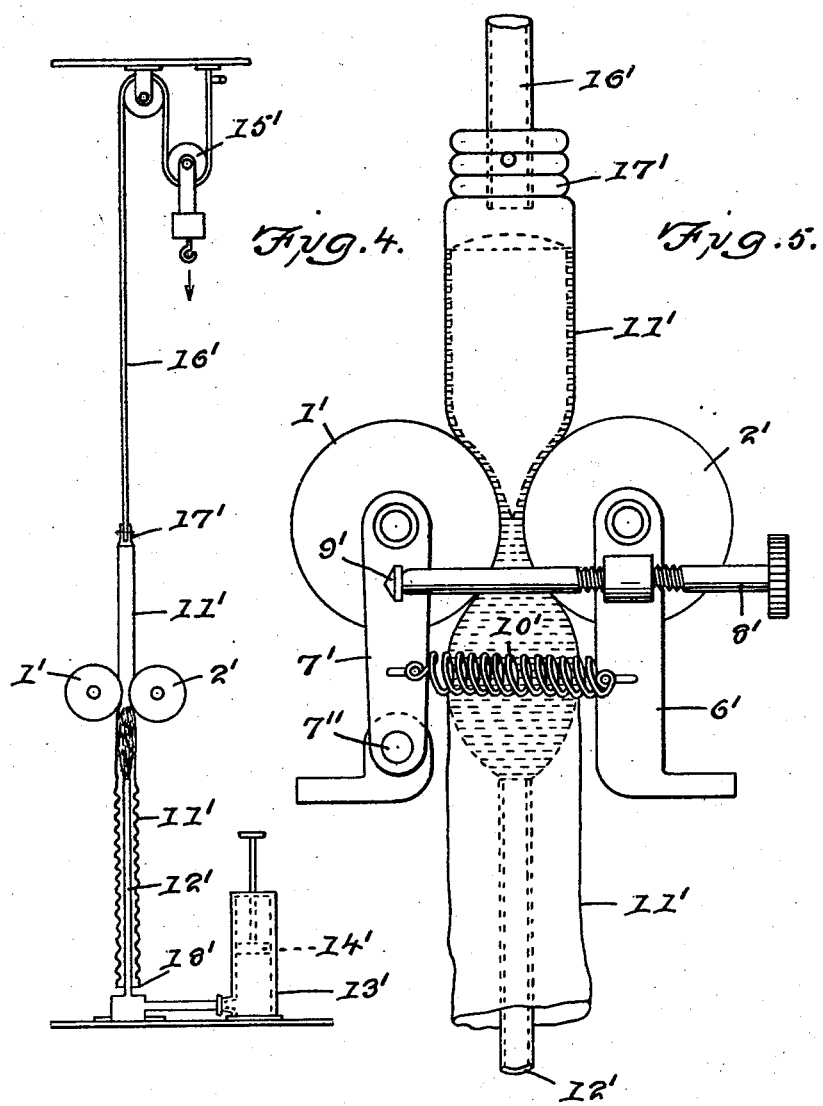

Inventor
Armin Bergmann

By Foster+Cooder
Attorneys

Patented Aug. 17, 1943

2,326,920

UNITED STATES PATENT OFFICE 2,326,920

APPARATUS FOR THE MANUFACTURE OF ARTIFICIAL SAUSAGE SKINS

Armin Bergmann, Pinneberg, Germany; vested in the Alien Property Custodian

Original application April 5, 1939, Serial No. 266,209. Divided and this application November 15, 1940, Serial No. 365,848. In Germany March 17, 1938

3 Claims. (Cl. 18—15)

This invention is for improvements in or relating to apparatus for the manufacture of artificial sausage skins. The present application is a division of my U. S. A. application for Letters Patent Serial No. 266,209, filed April 5, 1939, now Pat. No. 2,257,222.

It is known to manufacture artificial sausage skins of a pasty mass of animal or vegetable albuminous substances, in particular underskin swollen in water.

In the known methods of producing artificial sausage skins from these substances, the pasty mass is, for example, expressed from an annular nozzle on to the outside of an internally supported fabric envelope so as to form a thin layer thereon, and the skin thus formed is separated from the fabric envelope after drying in position thereon. A cylindrical core serves as the internal support of the fabric envelope and is provided with indentations or the like which serve as supporting surfaces for rollers to hold the core.

It has also been proposed in the manufacture of artificial sausage skins, to spray or express a steeped mass of a suitable skin-forming substance on to the inner surface of a rigid cylindrical hollow mould.

According to a further known method, a steeped mass of a skin-forming substance is placed under pressure on the inner surface of a tubular mould which is adapted to be withdrawn from a cylindrical bottom projection of a storage container and withdrawn in helical form therefrom. Such considerable difficulties are experienced, however, in using this method that it has not been found practicable to manufacture sausage skins in actual practice by it.

Finally, it is known to use tubular structures of regenerated cellulose as a substitute for intestines in making sausage skins, the tubular structures being provided with a hardened gelatine coating upon their inner surfaces.

An object of the present invention is to provide a suitable apparatus for practicing the process for the manufacture of sausage skins, described and claimed in my above mentioned application for Letters Patent, from a pasty swollen mass containing water and albumen, in particular underskin, in a simple manner and without the use of an annular nozzle or an internal fabric support.

The process for the maufacture of artificial sausage skins described and claimed in my said application, briefly stated, consists in forcing a dryable and hardenable steeped mass of an albuminous substance into a carrier tube composed of an absorbent material and simultaneously passing the tube, together with the steeped mass contained therein, through a constriction and at the same time forcing compressed air into the tube from the opposite end thereof to that from which the steeped mass is forced into the tube, so as to effect an inflation of the tube as it leaves the constriction and cause the steeped mass in the tube to form a skin around the inside thereof; leaving the skin to dry and harden in position in the tube, with the latter maintained in an inflated condition during this step; and stripping the skin from the tube by withdrawing it therefrom.

Further, in practicing the process described and claimed in my said application, it is preferred that the constriction shall be of an adjustable width whereby it is possible to control the thickness of the layer of steeped mass which becomes deposited on the internal surface of the tube as it is traversed through the constriction with the steeped mass contained within it. In this connection, it will be appreciated that the tube as it passes through the constriction flattens out and thus compresses and distributes the steeped mass within it evenly as a thin layer over the surface of the tube.

The carrier tube may be composed of any suitable material, conveniently parchment paper, cellulose paper or a suitable fabric.

Further according to my invention, one or more further layers of skin-forming material, which may, if necessary, be of a composition not adapted to harden, may be applied on to the first layer after the same has been permitted to dry and harden in position in the tube.

In order to prevent lumps or the like forming in front of or in the constriction in the steeped mass in the tube, in consequence of accumulation thereof in the tube, while the tube is being passed through the constriction, which lumps might cause layers of non-uniform thickness to be applied to the surface of the tube, thus producing a sausage skin which is not of uniform thickness and flexibility, the steeped mass is preferably distributed over the surface of the carrier tube at the instant of its passage through the constriction by being subjected to a thorough mixing at this point, this mixing being caused by a lateral displacement of the particles of the steeped mass adhering to the wall of the flattened tube, across the width thereof.

A particular advantage of the process according to my said application for patent is that it permits the production of very small sausage skins, which has been possible only with difficulty if at all by the hitherto known processes in which an albuminous substance is formed into a structure. Another advantage of the process is that it is possible for the first time to make an artificial sausage skin which is an effective substitute for dried gut.

Dried guts are used for making small boiling sausages, for example, saveloys, Vienna sausages and the like. These sausages are not tied at the ends but are only closed by the twisting of the gut, which is adhesive on the inside.

Sausage skins of this type may be made with the apparatus of the present invention, since the invention permits of a plurality of layers of steeped mass containing albumen to be superimposed upon one another on the inside of the carrier tube.

To this end, a first layer is produced in the manner described, using a steeped mass of an albuminous substance which incorporates a hardening agent such, for example, as formaldehyde. This first layer is then left to harden and dry with the tube in an inflated condition, during which time the layer can be gently warmed from the outside of the tube. To terminate the hardening process, the excess formaldehyde is converted into hexamethylene-tetramine by the action of gaseous ammonia. The carrier tube with the first layer of skin adhering to it is then passed afresh through the applying device. This time there is applied in the same way a second layer of albuminous substance but in the case of this layer the albuminous substance is devoid of a hardening agent. The second layer is then allowed to dry in situ upon the first layer in the tube. In the manufacture of boiling sausages, the second layer is made adhesive by the moisture of the sausage meat filled into the skin. In this way, the twisted ends of the sausage can be quite closed as is the case with natural gut skins.

The apparatus according to the present invention, briefly stated, consists of a container for the steeped mass; a piston therein for forcing the mass out of the container; an outlet tube from the container adapted to accommodate around it a flexible tube to form the carrier tube accumulated in folds; a constriction through which the carrier tube and steeped mass are passed, formed by the space between two mutually opposed members which are preferably adjustable towards and away from one another; means for introducing air under pressure into the end of the carrier tube remote from the end from which the steeped mass is introduced into the tube, for the inflation thereof; and a device for drawing the carrier tube through the constriction.

The mutually opposed members which form the constriction may conveniently consist of an oppositely disposed pair of rigid bars adjustable towards and away from one another and so shaped as to provide between them a constriction through which the carrier tube and its contents may be drawn.

In order, however, to effect the distribution hereinbefore referred to of the steeped mass over the wall of the flattened tube as this and the steeped mass are passed through the constriction, it has been found advantageous to use for the formation of the constriction a pair of rollers which are rotatable about their axes and of which one is preferably movable backwards and forwards in an axial direction during the rotation of the rollers, for example by an eccentric. In this event, the other roller may be arranged to move pivotally towards and away from the first roller and its normal or operative distance from that roller may be finely adjusted by means of a suitable adjusting device, in order to be able suitably to regulate the thickness of the applied layer of skin-forming material on the flattened walls of the tube.

The carrier tube, together with the steeped mass therein is carried between the pair of rollers. To the opposite end of the carrier tube to that from which the steeped mass is introduced into it, is connected the end of a flexible compressed air pipe which is carried over a lifting device.

By replacing the system of rigid bars by a pair of rollers as described, as the means which forms the constriction, the passage of the carrier tube and its contents through the constriction is considerably facilitated and assisted, since sliding friction is replaced by rolling. The roller actuated, for example, by the eccentric, slides backwards and forwards, so shifting the sides of the flattened tube as it passes through the constriction. By means of this movement of the sides of the carrier tube, the particles of the steeped mass within, partly adhering to the sides of the tube or drawn therethrough, are positively shifted with respect to each other. In this way the formation of lumps or cavities in the layer of skin-forming material on the wall of the tube is avoided and as a result the material is distributed extremely uniformly over the entire surface of the tube.

Owing to the uniform distribution of the material over the inner surface of the carrier tube, a much greater strength is attained of the dried artificial sausage skin as compared with the products which are obtainable when the mass is not so intimately admixed in its passage with the tube through the constriction. Furthermore, the carrier tube is less strained by the provision of the movable rollers than in the case where it is simply drawn through a gap between two fixed bars as in the first form of the constriction hereinbefore referred to, and consequently it can be used and re-used a greater number of times before it is worn out.

The freedom for pivotal movement or oscillation of one of the rollers towards and away from the other, which is provided according to the preferred arrangement described, is to enable the rigid jointing sleeve (hereinafter more particularly referred to) of the compressed air pipe to be inserted easily between the pair of rollers in the operation of fitting it on to the upper end of the carrier tube. The arrangement in this respect is also advantageous as taking into account the possibility of foreign solid bodies gaining access into the carrier tube in admixture with the pasty mass to form the skin on the wall thereof. As such hard foreign bodies pass through the constriction they have the effect simply of laterally forcing the oscillatable roller away from the other roller so as to permit the passage of the foreign body through the constriction without causing any trouble, for example, damage to the carrier tube or a blocking of the constriction.

In order to prevent the rollers from being forced apart during the normal passage past them of the carrier tube with its content of skin-forming material, by the pressure of the mass within the tube, the bearings of the rollers are preferably held in their adjusted position by a suitable device, for example, a tension spring.

By the arrangement of a carrier tube which is provided at its upper and lower ends with rigid sleeves or the like adapted to be screwed, the fastening or removing of the drawing device from the tube is considerably facilitated.

Two embodiments of the invention will now be described with reference to the accompanying drawings, in which Figure 1 is a side elevation partly in section of an apparatus constructed in accordance with the invention, the form of the invention according to this embodiment being one in which the axis of the constriction and of the carrier tube as it is drawn therethrough is horizontal and the constriction is constituted by the gap between a mutually opposed pair of rigid bars;

Figure 2 is a front view of the constriction of the apparatus shown in Figure 1;

Figure 3 illustrates the manner in which a finished artificial sausage skin produced in accordance with the invention is drawn out of the carrier tube;

Figure 6:
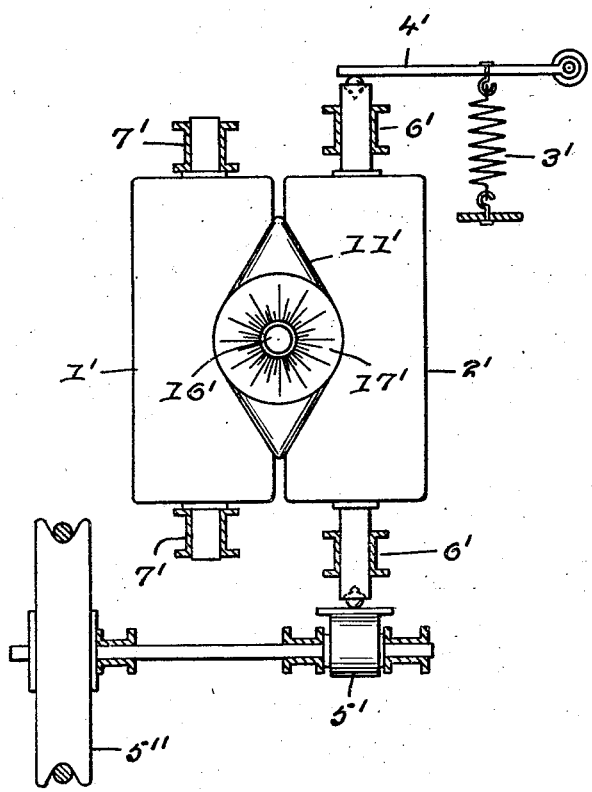

Figure 4 is an elevation of an apparatus in accordance with the invention, illustrating an embodiment thereof in which the axis of the carrier tube as it is drawn through the constriction is vertical, the constriction is constituted by the space between a mutually opposed pair of rollers, and the tube and its contents are drawn through the constriction by means of a lifting cord pulling upon the end of the tube and serving at the same time as the compressed air pipe for supplying air under pressure to the leading end of the carrier tube;

Figure 5 is an enlarged elevation of the pair of rollers forming the constriction in the apparatus shown in Figure 4, and Figure 6 is a plan view of the said rollers, showing an eccentric and other parts associated with the rollers.

Referring to Figures 1 to 3 of the drawings, the steeped mass is contained in a container 1 from which it is forced by a piston 2 into an outlet tube 3. Over the outlet tube 3 is accumulated in folds a carrier tube 4 of parchment paper or the like. The steeped mass passes out of the tube 3 into the tube 4, together with which it passes through a constriction formed by the space between two rigid bars 5, 6 which are adjustable towards and away from one another by means of adjusting screws 10, 11. Through this constriction only a limited quantity of the steeped mass can pass, this quantity being proportional to the width of the gap. As the mass passes the constriction, it is pressed out into the form of a thin layer adhering to the flattened wall of the carrier tube. Compressed air is blown into the opposite end of the tube 4, which for this purpose is firmly connected to a compressed air pipe 7. In this way, the tube 4 on leaving the constriction is inflated and at the same time the steeped mass is forced on to the inside of the carrier tube in a uniform layer 8.

After the inside of the whole of the carrier tube 4 has been thus coated with the steeped mass and the artificial sausage skin has thereby been formed in the tube, the two ends of the tube, still inflated with compressed air, are tied up and the tube is suspended, with application if necessary of gentle heating through the wall of the tube, until the layer 8 on the inside of the tube has hardened and dried. The tube is then treated with dry ammonia gas and a string line 9 is tied on to one end of the artificial sausage skin 8 still in the interior of the tube, the string being passed through the tube, as illustrated in Figure 3 of the drawings, and the skin 8 being drawn out of the tube thereby.

Before the skin 8 has been removed from the tube 4, there can be applied on to it and by the same general process one or more further layers of the steeped mass, as hereinbefore described.

Referring now to Figures 4 to 6, the roller 2' of a pair of rollers 1', 2' is rotatable in bearings 6' and is held against axial movement by a suitable tension device for example, a tension spring 3' and lever 4'. The roller 2' is axially pressed against an eccentric 5' which can be actuated in a known manner by a belt pulley 5''. By the rotation of the eccentric and the tractive effect of the tension device, there is produced a reciprocating movement of the roller 2' in an axial direction of the roller. Opposite the roller 2' is the roller 1', which is rotatable in its bearings 7' but is not adapted to move axially. This roller 1' is preferably free to oscillate in a lateral direction perpendicular to its axis about the pivots 7''. The distance between the rollers 1', 2' is regulated by an adjusting device, for example, an adjusting screw 8' and stop 9', whilst the bearing blocks 6', 7' of the rollers 1', 2' are forced together, for example, by a tension spring 10'.

A carrier tube 11' is accumulated in folds over a tube 12' leading from a container 13' which is provided with a pressure piston 14', the steeped or pasty mass is pressed out of the container 13' through the tube 12' into the carrier tube 11' and passes with this through the constriction which is constituted by the space between the rollers 1', 2'. The conveyance of the carrier tube 11' and the mass within it through the constriction is effected by drawing the tube 11' upwards by means of a lifting device 15' and a lifting cord 16', the cord 16' serving preferably at the same time as a compressed air pipe for introducing compressed air into that part of the carrier tube 11' which has emerged from the constriction between the rollers 1', 2'. The upper and lower ends of the carrier tube 11' are provided with rigid jointing sleeves 17', 18' adated for example, to be screwed on.

The carrier tube may be composed of any comparatively sensitive material such, for example, as cellulose hydrate, (so-called Cellophane), cellulose acetate, derivatives of cellulose and the like, or of an artificial resin adapted to swell in water or of a hardened albuminous substance such, for example, as gelatine.

I claim:

1. Apparatus for the manufacture of artificial sausage skins which comprises in combination a container suitable for containing a supply of a pasty swollen mass containing water and albumen, means for forcing said material from said container, outlet means from the said container, a flexible carrier tube composed of absorbent material accumulated in folds around said outlet means; means for flattening said carrier tube after it has been removed from said outlet means; and means connecting with said carrier tube for introducing a gas into the carrier tube after it has been operated on by said means for flattening it.

2. An apparatus for the manufacture of artificial sausage skins which comprises in combination a container suitable for containing a supply of a pasty swollen mass containing water and albumen, means for forcing said material from said container, outlet means from the said container, a flexible carrier tube composed of absorbent material accumulated in folds around said outlet means; means for flattening said carrier tube after it has been removed from said outlet means, said means for flattening comprising two mutually opposed members, one of which is reciprocable relatively to the other transversely to said carrier tube; and means connecting with said carrier tube for introducing a gas into the carrier tube after it has been operated on by said means for flattening it.

3. Apparatus for the manufacture of artificial sausage skins which comprises in combination a container suitable for containing a supply of a pasty swollen mass containing water and albumen, means for forcing said material from said container, outlet means from the said container, a flexible carrier tube composed of absorbent material accumulated in folds around said outlet means; means for flattening said carrier tube after it has been removed from said outlet means, said means for flattening comprising a mutually opposed pair of rollers, one of which is axially reciprocable relatively to the other; and means connecting with said carrier tube for introducing a gas into the carrier tube after it has been operated on by said means for flattening it.

ARMIN BERGMANN.